United States Patent [19]

Mitani et al.

[11] 4,086,390
[45] Apr. 25, 1978

[54] FLYWHEEL FOR RECORDING AND OR REPRODUCING APPARATUS

[75] Inventors: Seishu Mitani, Kyoto; Tsuneo Kudo, Hachiouji; Minoru Mitani, Kyoto; Shuichi Saido, Hasuda, all of Japan

[73] Assignee: Japan Powder Metallurgy Co., Ltd., Tokyo, Japan

[21] Appl. No.: 724,377

[22] Filed: Sep. 17, 1976

[51] Int. Cl.² .............................................. B22F 5/00
[52] U.S. Cl. .................................. 428/550; 428/553; 75/243; 75/246; 74/572
[58] Field of Search .............. 29/182.3, 182; 74/572; 428/550, 553; 75/243, 246

[56] References Cited

U.S. PATENT DOCUMENTS

| 3,365,351 | 1/1968 | Maaz et al. ........................ 74/572 |
| 3,537,332 | 11/1970 | Andrews ........................... 74/572 |
| 3,940,268 | 2/1976 | Catlin ............................. 75/208 R |
| 3,982,934 | 9/1976 | Wentzell .......................... 75/208 R |
| 3,985,043 | 10/1976 | Toratani .......................... 74/572 |

FOREIGN PATENT DOCUMENTS 969,780   6/1975   Canada ................................. 74/572

OTHER PUBLICATIONS

"Powder Metallurgy" vol. 21, 1968, p. 133.

*Primary Examiner*—Brooks H. Hunt
*Attorney, Agent, or Firm*—McNenny, Pearne, Gordon, Gail, Dickinson & Schiller

[57] ABSTRACT

Disclosed is a flywheel assembly for recording and or reproducing devices which is produced by molding and sintering a mixture consisting principally of iron and graphite powders and, if necessary, a sulfur powder.

1 Claim, 3 Drawing Figures

FLYWHEEL FOR RECORDING AND OR REPRODUCING APPARATUS

BACKGROUND OF THE INVENTION

1. Field of the Invention

This invention relates to a flywheel assembly, and more particularly to a flywheel assembly for recording and or reproducing devices which is almost free from wow and flutter and extremely stable in balance during rotation.

2. Description of the Prior Art

In recording and or reproducing devices such as a tape recorder, a car stereo, etc., recording and or reproducing is usually achieved by driving a record medium such, for example, as a magnetic tape, or the like across a magnetic head. In such recording and or reproducing devices, the tape translation speed is liable to change to vary the recording and or reproducing frequency, causing wow and flutter which is a phenomenon peculiar to the recording and or reproducing devices. To avoid such a phenomenon, many efforts have heretofore been made.

A tape drive system usually employed in the recording and or reproducing devices is one that the tape is driven by the rotation of a capstan. With this system, a pinch roller is urged against the capstan whose peripheral speed is substantially equal to the tape translation speed and the tape is gripped between the pinch roller and the capstan and driven at a constant speed. In this case, the irregularity of rotation of the capstan gives rise to variations in its peripheral speed, resulting in fluctuation of the tape translation speed. The irregularity of rotation of the capstan is caused not only by eccentricity of its center of rotation but also by deficiencies of driving and power transmission parts such as variations in the rotation of a drive motor, irregularity of hardness of a belt and an idler, etc.

To prevent such irregularity of rotation of the capstan, it is the practice in the art to drive the capstan through a flywheel having sufficient moment of inertia to absorb the irregularity of rotation. In such a case, however, if the flywheel lacks balance and has no sufficient moment of inertia, the irregularity of rotation of the capstan is rather increased.

SUMMARY OF THE INVENTION

This invention has for its object to provide a flywheel assembly for recording and or reproducing devices which has sufficient moment of inertia and a stable balance to overcome the above said defects experienced in the past.

DESCRIPTION OF THE PREFERRED EMBODIMENTS

With reference to the drawings, this invention will hereinafter be described in detail.

Figure 1:
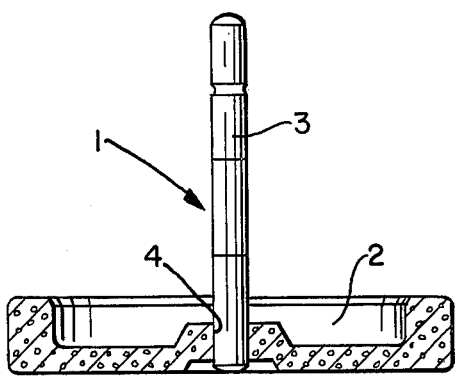
FIG. 1 is a cross-sectional view illustrating one embodiment of this invention.

In FIG. 1, reference numeral 1 indicates a flywheel assembly embodying this invention; 2 designates a flywheel; 3 identifies a capstan. The capstan 3 is fitted by force at one end into a centrally disposed hole 4 of the flywheel 2 to have a close fit therein. The flywheel 2 is formed principally of a sintered iron alloy, as will be described later on. In the present invention, the capstan 3 is fitted by force into the hole 4 of the flywheel 2 as mentioned above, so that unlike a conventional flywheel produced by die casting techniques the flywheel of this invention produces a stable flywheel effect during tape translation by driving of the capstan, with substantially no generation of wow and flutter from the power transmission system.

Conventional flywheels for use in recording and or reproducing devices are produced by die casting of zinc, cast iron, aluminum alloys, especially zinc. And it is customary in the prior art to make the peripheral portion of the flywheel thick to provide for increased moment of inertia.

In the recording and or reproducing devices, the tape is driven by the rotation of the capstan. The peripheral speed of the capstan is held equal to the tape translation speed and a pinch roller is pressed against the capstan with the tape being gripped therebetween. The irregularity of rotation of the capstan causes variations in its peripheral speed, making the tape translation speed uneven.

In the case where a flywheel having a thick peripheral portion and ribs is produced by die casting in zinc, the die is not uniformly filled with the molten metal because of different thickness of the peripheral and the ribbed portion. To obtain uniform fluidity of the molten metal, it is necessary to make the ribbed portion thick to some extent. That is, if the ribbed portion is too thin, fluidity of the molten metal in the die is remarkably lowered as a whole, so that cavities and segregation are inevitably introduced everywhere in the body of the flywheel to make it out of balance. However, even if the flywheel is produced by die casting in zinc, with the ribbed portion being thick to same extent as mentioned above, it is impossible to completely prevent such cavities and segregation over the conventional die-cast flywheels.

In short, homogeneity cannot be obtained in the body of the flywheel by die casting. Consequently, the flywheel after die-cast, is usually subjected to machining to obtain its balance. In other word, it is almost impossible to produce a well-balanced flywheel by die casting without machining.

Further, in the case of the flywheel made by die casting in zinc, the coefficient of thermal expansion of the flywheel is large and remarkably different from the capstan assembled therewith since the latter is usually made of iron or the like. Accordingly, there is the possibility of capstan coming out of the flywheel under the influence of ambient temperature.

Moreover, since the hollow of the flywheel for receiving the capstan is usually formed by machining, dispersion is easily introduced in the dimension of the hole. This introduces the possibility of the capstan being loosely coupled with the flywheel to come out thereof or the former being not assembled with the latter perpendicularly thereto. To avoid this, it is necessary in the prior art to insert or fit, for example, a brass bush, by force into the hole of the flywheel.

On the other hand, the flywheel of the invention is formed of a sintered steel consisting principally of iron powder particles by the employment of powder metallurgy techniques. Namely, iron powder particles are molded and sintered. In this case, the particles are each bonded with adjacent particles only at limited points on their surfaces, leaving voids therebetween. Accordingly, the voids are uniformly distributed in the body of the resulting flywheel, as shown in FIG. 1. Thus, the flywheel of this invention is entirely free from the cavities and segregation experienced in the case of die casting, and hence is homogeneous anywhere in its body and well-balanced.

Further, since the flywheel of this invention is homogeneous in its structure and can be obtained only by molding and sintering a described above, there is no need of taking into account such a problem as fluidity of the molten metal encountered in the prior art and the flywheel can be formed in any configuration only for the purpose on increasing moment of inertia. For example, it is possible to reduce the material used and to increase moment of inertia by decreasing the thickness of the ribbed portion. Moreover, it must be appreciated that the flywheel of this invention does not require any machine working for obtaining balance.

Where the flywheel is made of sintered steel as described above, it has substantially the same quality as the capstan assembled therewith. This prevents the flywheel from coming off the capstan due to the difference between their coefficients of thermal expansion, even if the ambient temperature changes. Further, since the flywheel of this invention can be formed in any desired configuration as mentioned above, it can be molded to have the hole for receiving the capstan from the beginning, and accordingly there is no need of forming the hole in the flywheel as in the prior art. Moreover, the above-mentioned uniform distribution of the voids in the flywheel body provides therein sufficient elasticity to ensure a close fit of the capstan in the hole of the flywheel.

Such an internal structure of the flywheel produces various advantages. In particular, the flywheel of this invention produces an excellent flywheel effect to provide for enchanced acoustic effect when employed in a recording and or reproducing devices.

Figure 2:
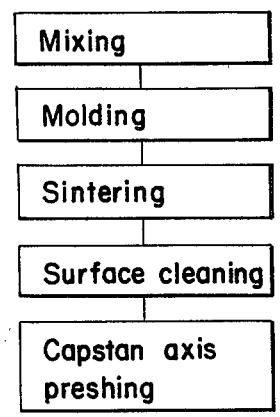
FIG. 2 is a flow chart showing the steps involved in the manufacture of the flywheel of this invention.

The flywheel of the above-said structure can be manufactured by an ordinary powder metallurgy method as shown in FIG. 2.

The manufacture starts with mixing of graphite, zinc stearate and sulfur powders with an iron powder which is the principal component, by an ordinary method. The mixture is molded under a pressure, for example, of 4 to 7 ton/cm$^2$ to obtain, a disc-like molding as depicted in FIG. 1. In this case, an increase in the pressure for molding causes a decrease in the number of voids but a pressure less than 4 ton/cm$^2$ impairs subsequent sintering of the molding to make it impossible for the resulting flywheel to have its required mechanical strength. Accordingly, the molding pressure is 4 to 7 ton/cm$^2$, preferably 5 to 6 ton/cm$^2$.

The next step is to sinter the molding by a known method in a continuous sintering furnace.

Thereafter, the sintered compact is subjected to surface cleaning by shot blasting and then rust proof treatment by means of a vapor rust proof furnace or painting apparatus. Thereafter, a capstan is fitted by force into the hole of the flywheel, as depicted in FIG. 1.

One concrete example of this invention is as follows:

0.5% by weight of graphite and a small amount of zinc stearate were mixed with an iron powder ( consisting of 0.05% by weight of carbon, 0.40% by weight of manganese, 0.20% by weight of silicon, 0.015% by weight of sulfur and 0.015% by weight of phosphorus and balance iron ). The mixture was molded and the compact was sintered and subjected to surface treatment for rust resistance. Then, a capstan was fitted into the hole of the flywheel under a pressure of 5 ton/cm$^2$ by an oil press.

Figure 3:
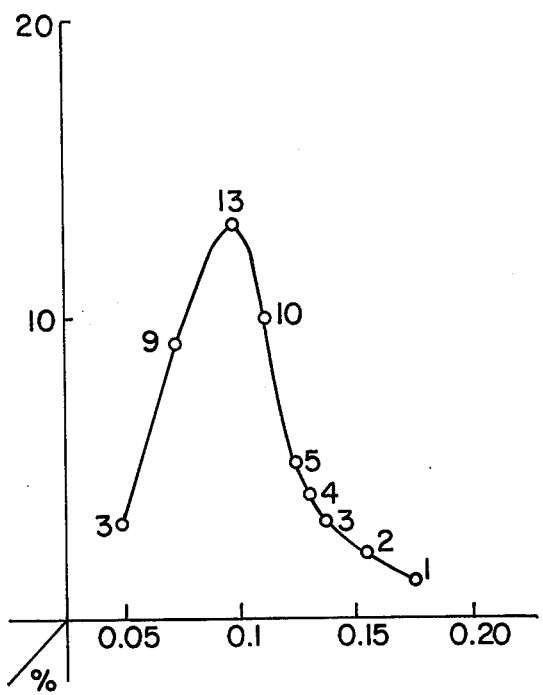
FIG. 3 is a graph showing measured values of wow and flutter of the flywheel of this invention.

Wow and flutter of 50 units of flywheels constructed according to the above example were measured and then the measured values were subjected to auditory-sense correction. The corrected values are as shown in FIG. 3, the abscissa representing wow and flutter in rms ( the Japanese Industrial Standards ) and the ordinate the number of flywheels.

Similar measurement was conducted in connection with ordinary flywheels produced by die casting in zinc and the values obtained were almost in the vicinity of 0.15 rms.

What is claimed is:

1. A flywheel assembly used for recording and reproducing devices, characterized in that said assembly comprises a flywheel and a capstan force-fitted therein, said capstan being formed of an iron casting, said flywheel comprising a pressed and sintered mixture of powders consisting of iron powder, graphite powder, zinc stearate powder and sulfur powder, particles of said iron powder being bonded to adjacent iron powder particles at limited points on their surfaces to form voids therebetween, said voids being distributed uniformly throughout the flywheel.

* * * * *